A. W. TUFTS.
COTTON AND CORN PLANTERS.
No. 184,447.     Patented Nov. 14, 1876.
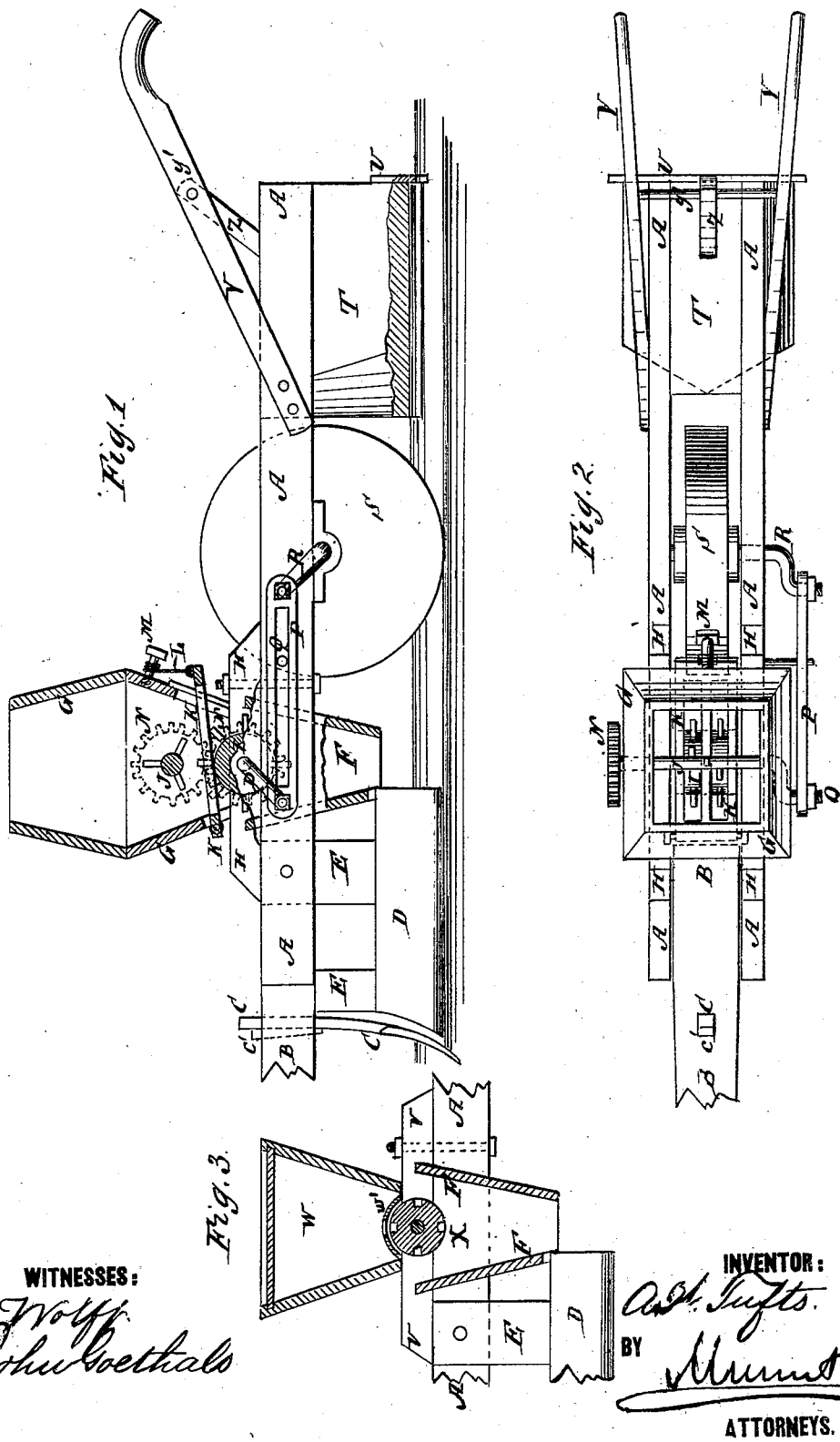
WITNESSES:
INVENTOR:
ATTORNEYS.

UNITED STATES PATENT OFFICE.

ANTHONY W. TUFTS, OF PORT VINCENT, LOUISIANA.

IMPROVEMENT IN COTTON AND CORN PLANTERS.

Specification forming part of Letters Patent No. 184,447, dated November 14, 1876; application filed September 16, 1876.

*To all whom it may concern:*

Be it known that I, ANTHONY WAYNE TUFTS, of Port Vincent, in the parish of Livingston and State of Louisiana, have invented a new and useful Improvement in Cotton and Corn Planter, of which the following is a specification:

Figure 1 is a side view of my improved machine arranged as a cotton-planter, parts being broken away to show the construction. Fig. 2 is a top view of the same.

Fig. 3 is a detail section of a part of the same arranged as a corn-planter.

Similar letters of reference indicate corresponding parts.

The object of this invention is to furnish an improved seed-planter, simple in construction, convenient in use, and effective in operation, and which shall be so constructed that it will run steadily, and may be readily adjusted to plant cotton-seed or corn, as may be required.

The invention consists in the arrangement of an adjustable rack between the distributing-shaft and the stirrer-shaft of a cotton-planter, for the purpose of regulating the discharge of the seed.

A are the side bars of the frame, to and between the forward ends of which is secured the draw-bar B. C is the opening-plow, the standard of which passes up through a hole in the draw-bar B, where it is secured in place by a wedge, $c'$. D is the furrow-block for pressing back the sides of the furrow, and packing them so that the soil will not fall in and partially fill the furrow before the seed can be deposited in it. The furrow-block D is made long and narrow, has its lower edge rounded off, and is attached to the lower ends of two standards, E, the upper ends of which are attached to the frame A B. To and between the side bars A is attached the conductor-spout F in such a position as to conduct the seed into the furrow at the rear end of the furrow-block D. The conductor-spout F is made hopper-shaped, or with a wide upper end, so that it may readily receive the seed as it escapes from the hopper, and prevent it from being scattered. G is the cotton-seed hopper, the sides of the lower end of which are secured to two bars, H, which are placed upon and bolted to the side bars A. To the bars H, in the lower part of the hopper G, is pivoted a cylinder, I, which is provided with radial fingers to take hold of the cotton-seed and draw it out of the hopper G. To the sides of the hopper G, directly above the cylinder I, is pivoted a stirrer-shaft, J, which is provided with radial fingers to keep the seed stirred up and feed it down to the cylinder I. In the lower part of the hopper G, between the cylinder I and the stirrer-shaft J, is placed a rack, K, the ends of which pass through openings in the front and rear sides of the lower part of the hopper G, and which is kept from being drawn out by a pin passed through its end at the forward side of the hopper G. To the end of the rack K, at the rear side of the hopper G, is attached one end of a cord, L, the other end of which is attached to and wound upon a pin or screw, M, attached to the rear side of the hopper G, so that, by winding the cord L upon, or unwinding it from, the pin or screw M, the end of the rack K will be raised and lowered so that the fingers of the cylinder I may project to a less or greater distance through the rack K to draw out less or more seed, as may be desired. To the journals of the cylinder I and shaft J, at one side of the hopper G, are attached two gear-wheels, N, meshing into each other, so that the stirrer-shaft J may be moved by the movements of the cylinder I. To the journal of the cylinder I, at the other side of the hopper G, is attached, or upon it is formed, a crank, O, to which is pivoted the end of a connecting-rod, P. The middle part of the rod P is slotted longitudinally to receive a pin, Q, attached to the side bar A, and which serves as a guide and fulcrum to the rod P. The other end of the rod P is pivoted to a crank, R, formed upon or attached to a journal of the wheel S, which is pivoted to side bars A, and the rim of which is made wide to adapt it to press the seed into the soil and partially cover it. The covering of the seed is completed by the covering-block T, which is attached to the rear ends of the side bars A. The forward end of the covering-block T is made V-shaped to press back lumps and clods, its lower side is concaved to press in the sides of the furrow and cover the seed, and to its rear end is attached a scraper, U, to level and smooth off the top of the ridge or row.

When the machine is to be used for planting corn the bars H, the hopper G, and their attachments are removed and replaced by the bars V and hopper W. To the bars V, in the lower part of the hopper W, is pivoted a cylinder, X, in the face of which are formed a number of recesses or cups to receive the seed and drop it into the conductor-spout F. The bottom of the hopper W is formed of a plate, $w'$, which is arched to fit upon the upper side of the cylinder X, and has holes formed in it corresponding in position with the recesses in the said cylinder X, to allow the seed to pass through into said recesses as they come beneath the said holes. The plate $w'$ also serves as a cut-off to prevent any more seed being carried out by the cylinder X than enough to fill its recesses. The size of the recesses in the cylinder X may be regulated by plugs or stoppers inserted in them. Y are the handles, the forward ends of which are bolted to the side bars A, and their rear parts are connected and supported by a round, $y'$, the middle part of which is connected with and secured to the upper end of a standard, Z. The lower end of the standard Z is secured to the covering-block T.

Having thus described my invention, I claim as new and desire to secure by Letters Patent—

In a cotton-planter, the combination of the vertically-adjustable rack K with the toothed distributing-shaft I and the hopper G, as and for the purpose set forth.

ANTHONY WAYNE TUFTS.

Witnesses:
    O. G. BRANNON,
    J. L. HARRIS.